Patented Jan. 23, 1940

2,187,882

UNITED STATES PATENT OFFICE 2,187,882

OLEFIN OXIDATION AND CATALYST THEREFOR

George H. Law, South Charleston, W. Va., assignor to Carbide and Carbon Chemicals Corporation, a corporation of New York No Drawing. Application August 7, 1937,
Serial No. 157,883

11 Claims. (Cl. 260—348)

One of the most common expedients for obtaining catalytically active metallic surfaces for use in carrying out various catalytic reactions is by alternate oxidation and reduction of the metal. In most cases this can be done by passing air or oxygen over the heated metal, followed by reduction of the metal oxide with hydrogen or the like. In the chemically unique reaction of the process invented by T. E. Lefort and shown in Reissue Patent 20,370, dated May 18, 1937, olefin oxides are formed by causing olefins to combine directly with molecular oxygen in the presence of a surface catalyst at temperatures between about 150° and about 400° C. Silver is the preferred catalyst for effecting Lefort's reaction, and it is, of course, desirable to use a silver surface catalyst for this reaction which has a maximum of catalytic activity.

Due to the low dissociation temperature (at atmospheric pressure) of silver oxide, it is not possible to oxidize silver easily by either air or oxygen for the purpose of increasing its activity as a catalytic material according to the common procedure mentioned. For this reason, special conditions are required for the preparation by oxidation of silver surface catalysts in those highly active forms desired for the economic conduct of the Lefort process.

The primary object of this invention is to provide a convenient, simple and effective method of activating silver surface catalysts for use in the direct oxidation of olefins to form olefin oxides. The invention also includes the new catalysts as well as the improvements in the process of oxidizing olefins directly to form olefin oxides which are achieved by the use in the process of catalysts activated according to this invention.

The activation of silver surface catalysts for conducting the process of forming olefin oxides by direct oxidation of olefins can be accomplished by treating the silver surface with water vapor and ozone at relatively low temperatures, followed by reduction of the silver peroxide formed with hydrogen at higher temperatures. Alternatively, reduction of the silver peroxide can be replaced by a treatment with a solution of a hydroxide of barium, strontium or lithium. The active silver surface catalysts and their production according to the latter treatment are the subject of my copending application Serial No. 198,858, filed March 30, 1938, now matured into Patent No. 2,142,948.

Surface catalysts which contain silver in any physical form can be treated by the methods of this invention to effect pronounced increase in their activity in the Lefort reaction. The extent to which the catalytic activity is increased may be varied considerably, and is dependent both on the original form and condition of the silver and on the number of times the ozonization and reduction are repeated, and on whether treatment of the ozonized product with barium, strontium or lithium hydroxide replaces the final reduction. In general, finely divided silver having a roughened surface is more readily activated than silver in forms having a smooth polished surface.

It is desirable, but not essential, to start with silver deposited on the surface of a granular inert supporting material, such as porous artificial silica filter stone, sandstone, or one of the commercially available alumina refractory materials. The silver may be deposited on such a support by chemical means, as by the decomposition of a silver salt, or mechanically from suspensions of finely divided metallic silver or silver oxide. The amount of silver in those catalysts which employ supporting materials may vary over a wide range, but, in general, from about 4% to about 20% by weight is satisfactory.

Although silver peroxide decomposes at the temperatures of around 150° to 400° C. which are employed in operation of the process of oxidizing olefins directly to form olefin oxides, the silver surface catalysts are much less active when used in the ozonized condition than when they are reduced with hydrogen or treated with a solution of barium, strontium or lithium hydroxide subsequent to the ozone treatment.

The ease with which ozonization may be accomplished varies with the original condition and form of the silver in the same way as does the extent of activation conferred by the treatment. Thus, in the activation of silver in the form of powder (200 mesh or finer), or material derived from the decomposition of silver nitrate, the ozonization occurs satisfactorily at room temperature. On the other hand, silver wire which presents a highly polished, smooth surface may require a temperature of 200° C. or higher for the initial peroxidation. In any case, after one ozonization and decomposition of the silver peroxide has been successfully effected, succeeding reactions with ozone can be carried out at atmospheric temperature. In general, ozonization may be carried out at temperatures from about 20° to 250° C., dependent on the circumstances discussed, and the preferred temperature for this operation is about 40° to 50° C. Reduction of the silver peroxide with hydrogen is inaugurated, but proceeds slowly, at about 90° C., and it is quite rapid above 200° C. This step of the procedure may be effected at temperatures ranging from about 100° to about 250° C., and the preferred temperature for the reduction is about 150° C. Reducing gases other than hydrogen may be employed, but it is preferable to use hydrogen for this purpose.

In the treatment of silver with ozone, it is desirable to avoid the use of equipment formed of iron, copper or plain steel, since these materials tend to promote a rapid decomposition of ozone. Such materials as aluminum, glass or chromium steels do not exert this effect and are satisfactory. Silver peroxide itself also tends to hasten the decomposition of ozone, but this tendency can be largely overcome by adding liquid water to the reaction vessel at such a rate as to provide a coating of liquid water for the silver peroxide as it is formed, but not for the unreacted silver. The presence of water vapor is necessary for the reaction between silver and ozone, but the existence of a film of liquid water on the material appears to inhibit this reaction.

The following examples will serve to illustrate the invention:

Example 1

A catalyst tube made of heat-resistant glass having an inside diameter of about one inch and provided with an inner glass tube 0.25 inch in outside diameter was used for the treatment of the silver surface catalyst and for the conduct of the olefin oxidation. The inner tube extended 25 inches into the catalyst tube from its exit end and served as a pyrometer well. The catalyst tube was arranged to be heated electrically over 36 inches of its length.

About 75 grams of fine silver wire (0.005 inch diameter) was placed in the tube near its exit end, forming a section about 12 inches in length in the annular space around the inner tube. The inlet end of the tube was packed with chips of porous silica stone and served as a preheating section for the gases.

The temperature of the tube was raised to and maintained at about 80° C., and oxygen saturated with water vapor and containing about 1% ozone was admitted to the tube at the rate of 7 liters per hour. This was continued for about 30 minutes after the odor of ozone could be detected in the gases issuing from the tube. The ozonized silver was then reduced with hydrogen for about 4 hours at 150° C., again treated with ozone at room temperature, and finally reduced at 150° C.

The temperature of the reduced catalyst was then raised to about 185° C., and a mixture of air and ethylene containing about 5% ethylene was fed to the tube at the rate of 56 liters per hour. Under these conditions, it was found that the yield of ethylene oxide produced was equal to about 5% of the ethylene admitted. A sample of the same silver wire which had not been treated with ozone did not give rise to the formation of ethylene oxide under otherwise identical conditions at any temperature below 300° C.

Example 2

A catalyst was prepared by evaporating to dryness an aqueous suspension of 25 grams of 200 mesh silver powder and 200 cc. of granular porous silica stone sized between 4 and 8 mesh screens. The resulting catalyst material was then repeatedly ozonized as described in Example 1 and reduced and finally treated in ozonized condition with a barium hydroxide solution. Each treatment with ozone was carried out at room temperature. The first reduction with hydrogen was conducted at 250° C., and all subsequent reductions were carried out at 150° C. The treatment with barium hydroxide was carried out by heating the ozone-treated material to a temperature of 90° C. and introducing into the catalyst tube a solution of barium hydroxide octahydrate also heated to 90° C. After standing five minutes over the catalyst, the barium hydroxide solution was drained off.

The material was tested under operating conditions for the production of ethylene oxide at various times between the several series of activating treatments. In each case a mixture of ethylene and air containing 10% of ethylene was passed at the rate of 56 liters per hour over the catalyst while it was maintained at a temperature of 290° to 295° C. in a catalyst tube made of a stainless steel (containing about 18% Cr and about 8% Ni) of the same form and dimensions as that described in Example 1. The first test was made after the material had been ozonized, reduced and again ozonized. In this condition it was found to exert very little catalytic activity, producing less than 0.1% ethylene oxide in the exit gases. It was again tested after being once more ozonized, reduced and ozonized, and its activity was the same as before. This shows that the catalysts according to this invention have no substantial activity when employed in the ozonized condition. The third test for the production aof ethylene oxide was made after the material had been once more ozonized and reduced with hydrogen. In the reduced condition it was found to be much more active, yielding about 1.9% ethylene oxide in the exit gases. This treatment was repeated and the catalyst again used in reduced condition, whereupon it produced about 2.25% ethylene oxide in the issuing gases. Finally, the material after being again ozonized and treated with a solution of barium hydroxide was made to produce ethylene oxide amounting to 4.0% of the exit gases.

Variations in the specific procedures shown in the foregoing examples will be apparent and may be adopted without departing from the essentials of this invention. The catalysts activated in accordance with this invention can be used to cause olefins, especially ethylene, to combine directly with molecular oxygen to form the corresponding olefin oxide at temperatures between about 150° and about 400° C. Also, and as shown by Lefort, the reaction proceeds at either atmospheric pressure or at increased or decreased pressures, and any desired proportion of the olefin and oxygen or air (or other oxygen-containing gas) can be used. The surface catalysts of this invention can be disposed in the reaction vessel in any desired means which will insure the necessary contact of the reactants with the catalyst. The size of the particles of the catalyst support is not critical and can be chosen to suit the conditions of operation. In the event that such materials as barium hydroxide are introduced into the ozonized catalysts, the proportion of these may range from about 2% to about 40% by weight of the silver contained in the catalyst.

Other modifications of the process employing the catalyst, as well as of the catalyst, are included within the scope of the invention as defined by the appended claims.

I claim:

1. Process of making olefin oxides by the direct chemical combination of olefins with molecular oxygen in the presence of a surface catalyst, which comprises employing a silver surface catalyst activated by treating the silver surface of said catalyst with ozone to form silver peroxide and subjecting the ozonized silver to the action of a reducing gas at elevated temperature to form an active surface catalyst.

2. Process of making olefin oxides by the direct chemical combination of olefins with molecular oxygen in the presence of a surface catalyst, which comprises employing a silver surface catalyst activated by treating the silver surface of said catalyst with ozone and water vapor to form silver peroxide and subjecting the ozonized silver to the action of a reducing gas at elevated temperature to form an active surface catalyst.

3. Process for activating silver surface catalysts for use in effecting the direct chemical combination of olefins with molecular oxygen to form olefin oxides, which comprises treating the silver with ozone and water vapor at a temperature between about 20° and about 250° C. to form silver peroxide and subjecting the ozonized silver to the action of hydrogen at a temperature between about 90° and about 250° C. to form an active surface catalyst.

4. Process for activating silver surface catalysts for use in effecting the direct chemical combination of olefins with molecular oxygen at temperatures between about 150° and about 400° C. to form olefin oxides, which comprises treating the silver surface with ozone and water vapor at a temperature between about 20° and about 250° C. to form silver peroxide while admitting liquid water to the reaction vessel at a rate sufficient to provide a film of liquid water on the silver peroxide only, and subjecting the ozonized silver to the action of a reducing gas at elevated temperature to form an active surface catalyst.

5. Process for activating silver surface catalysts for use in effecting the direct chemical combination of olefins with molecular oxygen at temperatures between about 150° and about 400° C. to form olefin oxides, which comprises treating the silver surface with ozone and water vapor at a temperature between about 20° and about 250° C. to form silver peroxide while admitting liquid water to the reaction vessel at a rate sufficient to provide a film of liquid water on the silver peroxide only, and subjecting the ozonized silver to the action of hydrogen at a temperature between about 90° and about 250° C. to form an active surface catalyst.

6. Process of making ethylene oxide by the direct chemical combination of ethylene with molecular oxygen at temperatures between about 150° and about 400° C. in the presence of a surface catalyst, which comprises employing a silver surface catalyst activated by treating the silver surface with ozone and water vapor at a temperature between about 20° and about 250° C. to form silver peroxide on said surface and thereafter subjecting the ozonized surface to the action of a reducing gas at elevated temperature to produce an active catalytic surface.

7. Process of making ethylene oxide by the direct chemical combination of ethylene with molecular oxygen at temperatures between about 150° and about 400° C. in the presence of a surface catalyst, which comprises employing a silver surface catalyst activated by treating the silver surface with ozone and water vapor at a temperature between about 20° and about 250° C. to form silver peroxide on said surface and thereafter subjecting the ozonized surface to the action of hydrogen at elevated temperature to produce an active catalytic surface.

8. Process of making ethylene oxide by the direct chemical combination of ethylene with molecular oxygen at temperatures between about 150° and about 400° C. in the presence of a surface catalyst, which comprises employing a silver surface catalyst activated by treating the silver surface with ozone and water vapor at a temperature between about 20° and about 250° C. to form silver peroxide on said surface and thereafter subjecting the ozonized surface to the action of hydrogen at a temperature between about 90° and about 250° C. to produce an active catalytic surface.

9. Process of making ethylene oxide by the direct chemical combination of ethylene with molecular oxygen at temperatures between about 150° and about 400° C. in the presence of a surface catalyst, which comprises employing a silver surface catalyst activated by treating the silver surface with ozone and water vapor at a temperature between about 20° and about 250° C. to form silver peroxide on said surface while admitting liquid water to the reaction vessel at a rate sufficient to provide a film of liquid water on the ozonized surface only, and thereafter subjecting the ozonized surface to the action of hydrogen at a temperature between about 90° and about 250° C. to produce an active catalytic surface.

10. An active silver surface catalyst for effecting the direct chemical combination of olefins with molecular oxygen at temperatures between about 150° C. and about 400° C. to form olefin oxides, composed of an extended silver surface which has been reacted with ozone and water vapor to form silver peroxide, followed by reduction of the ozonized silver by the action of a reducing gas at elevated temperature to form the active surface catalyst.

11. An active silver surface catalyst for effecting the direct chemical combination of ethylene with molecular oxygen at temperatures between about 150° and about 400° C. to form ethylene oxide, composed of an extended silver surface which has ben reacted with ozone and water vapor at a temperature between about 20° and about 250° C. to form silver peroxide, followed by reduction of the ozonized silver by means of hydrogen at a temperature between about 90° and about 250° C. to form the active surface catalyst.

GEORGE H. LAW.